United States Patent Office 3,152,952
Patented Oct. 13, 1964

3,152,952
ANTI-FIRE BLIGHT COMPOSITION
AND METHOD
Kenneth E. Maxwell, 1276 Ridgely Drive,
Campbell, Calif.
No Drawing. Filed Oct. 14, 1960, Ser. No. 62,520
2 Claims. (Cl. 167—18)

This invention relates to a composition which is useful as a bactericide and fungicide, more particularly to control fire blight on pears.

Pears are subject to attack by *Phytomonas amylovora* also known as *Erwinia amylovora*. This disease is commonly referred to as "fire blight." It is customary to protect pears against fire blight by dusting or spraying the foliage of pear trees and the fruits themselves with a mixture of a copper compound and lime. Such agents are phytotoxic and cause severe "russeting" of the fruit which is a discoloration of the skin of the fruit which adversely affects its marketability.

Sodium hypochlorite can be used in the form of a spray to inhibit fire blight, but it is unstable and otherwise objectionable. It is desirable to provide a nonphytotoxic material which can be used to inhibit fire blight and which is stable in storage.

It is an object of the invention to provide an improved bactericide and fungicide, more particularly to inhibit fire blight.

It is a further object to provide a stable, nonphytotoxic bactericide and fungicide which can be applied as a dust.

It is a particular object to provide a dusting material containing a hypochlorite as the principal, or as a major active ingredient, which is stable in storage, which is effective as a bactericide and fungicide for fire blight on pears, and which is nonphytotoxic.

The above and other objects of the invention will be apparent from the ensuing description and the appended claims.

I have discovered that by mixing a solid hypochlorite with an agent which increases alkalinity and also with a dessicant the composition is more stable in storage and in use and is more effective as a bactericide and fungicide.

The preferred composition of my invention is a mixture of calcium hypochlorite, hydrated lime (calcium hydroxide) and calcined gypsum, with the hydrated lime being the predominant ingredient by weight.

A specific and preferred example of a composition in accordance with the invention consists of 3 parts by weight of chloride of lime containing 34% available chlorine, 92 parts by weight of hydrated lime and 5 parts by weight of calcined gypsum containing some water of hydration but less than one-half molecule of water of hydration per molecule of $CaSO_4$.

These proportions can be changed materially. For example, on the basis of 100 parts by weight, the chloride of lime may be present in the amount of 1 part or less to 10 parts or more; the calcined gypsum may be present in the amount of 1 part or less to 15 parts or more; and the hydrated lime may vary accordingly. The proportion of calcined gypsum may be as high as 50 parts by weight (on the basis of a total of 100 parts by weight) or even more, with only enough hydrated lime being added to maintain the mixture alkaline. However, the proportions stated above are preferred.

Instead of chloride of lime (calcium hypochlorite) containing 34% available chlorine, other strengths, e.g., 70% available chlorine, may be employed, or other nonphytotoxic hypochlorites may be used such as sodium and magnesium hypochlorites, or mixtures of different hypochlorites.

Instead of hydrated lime, other alkaline materials such as magnesia and alkaline minerals such as soapstone, pyrophyllite or talc may be used. The alkaline material can be dispensed with altogether but its presence is much preferred.

The calcined gypsum can be replaced by other desiccants which act to prevent deterioration of the hypochlorite by absorption of moisture. Examples of other suitable desiccants are finely divided silica, silica gels, diatomaceous earth and neutral or alkaline absorbent clays.

The desiccant may be dispensed with entirely, but its presence is greatly preferred and it is preferably calcined gypsum.

The bactericidal and fungicidal materials of my invention are preferably applied as a dust but they can be mixed with water at the time of use and applied as a spray. As a dust they may be applied at the rate of 25 to 100 pounds per acre or enough to give ½ to 1 or more pounds of available chlorine per acre. As a spray at similar rates in enough water to give coverage, usually 50 to 1000 gallons per acre depending on the type of equipment and the amount of foliage.

The effective bactericidal and fungicidal agent is the hypochlorite, which apparently acts through the chlorine released by it. In the preferred form in which it is used it is stable in storage, it is effective as a bactericide and fungicide, e.g., to prevent or reduce fire blight on pears and it has very little or no phytotoxic effect, as shown by the fact that it causes little or no russeting of pears.

The dusting and spraying compositions may be applied to crops during all stages of growth including the dormant period, the period of leafing and flowering and the period of growth and ripening of fruits.

It will, therefore, be apparent that an effective, stable and nonphytotoxic material has been provided for use as a bactericide and fungicide, more particularly to combat fire blight on pears.

I claim:

1. An anti-fire blight composition comprising a solid, powdered admixture consisting essentially of a major proportion by weight of hydrated lime, about 1 to 10 percent of calcium hypochlorite and about 1 to 15 percent of calcined gypsum.

2. The method of treating pear trees to inhibit fire blight which comprises dusting the foliage of the trees with a solid admixture consisting essentially of a major proportion by weight of hydrated lime, about 1% to 10% of calcium hypochlorite and about 1% to 15% of calcined gypsum.

References Cited in the file of this patent

UNITED STATES PATENTS

| 1,408,535 | Ressler | Mar. 7, 1922 |
| 2,558,942 | Eagleson | July 3, 1951 |

FOREIGN PATENTS

| 457,416 | Great Britain | Nov. 2, 1936 |

OTHER REFERENCES

Frear: Chemistry of Insecticides, Fungicides and Herbicides, 2nd Ed., 1948, pp. 136, 154.